United States Patent Office 2,851,453
Patented Sept. 9, 1958

2,851,453

CELLULOSE DERIVATIVE PRODUCT, COMPOSITIONS COMPRISING THE SAME AND THEIR PREPARATION

Lloyd Kennon, Milwaukee, Wis., and Joseph V. Swintosky, Perkiomenville, Pa., assignors to Smith, Kline & French Laboratories, Philadelphia, Pa., a corporation of Pennsylvania No Drawing. Application August 9, 1954
Serial No. 448,755

4 Claims. (Cl. 260—232)

The present invention relates to a novel material possessing valuable properties making it available for use in the pharmaceutical and other fields; and, more particularly, the present invention relates to a novel acid carboxymethylcellulose product and to its method of preparation. The invention also relates to compositions comprising the novel acid carboxymethylcellulose product, including compressed compositions, such as tablets, and to the preparation thereof.

The sodium salt of carboxymethylcellulose, or as it is more conveniently referred to in the art, CMC, is usually prepared by reacting sodium cellulose with sodium monochloroacetate, in accordance with the following general type equation:

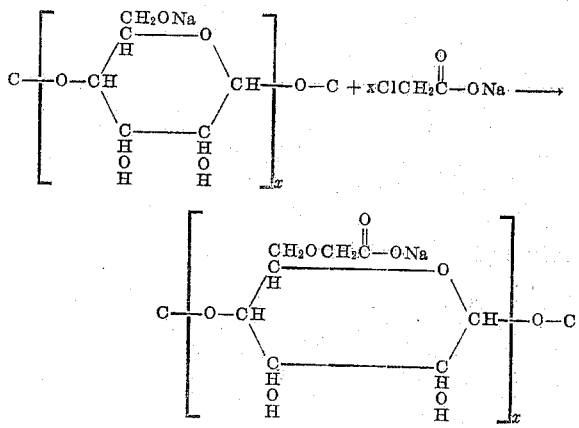

The position for substitution of sodium carboxymethyl groups is not fixed, and substitution may occur at carbons 2, 3 and/or 6 of the anhydroglucose residues. The degree of substitution is governed by the ratio of sodium cellulose and sodium monochloroacetate reacted and by the conditions of reaction. This material is sometimes referred to as cellulose gum, and is a water-soluble, fibrous or granular powder.

The acid form of carboxymethylcellulose is also available in the form of a colloidal dispersion in water. Such dispersions are usually prepared by treating an aqueous solution of the sodium salt of carboxymethylcellulose with an ion exchange resin to replace sodium ions of the sodium carboxymethylcellulose with hydrogen ions. The resulting dispersion of acid carboxymethylcellulose is primarily of utility in the formation of water-resistant films, since, by simple evaporation of the solution, a water-insoluble, relatively water-impermeable film may be produced. The dispersion of the acid carboxymethylcellulose itself is also useful as a suspending agent. The cast solid residue as such, however, has little, if any, further utility. It is a horn-like, non-friable material which is very difficult to grind. Reasonably extensive grinding does not produce a water-dispersible powder but rather a granular mass which rapidly settles out when added to water.

It is the principal object of the present invention to provide a novel product possessing advantageous properties making it of particular use especially in the pharmaceutical field.

It is another object of the present invention to provide a novel acid carboxymethylcellulose product having properties making it available for valuable uses wherein other known forms of acid carboxymethylcellulose have little or no utility.

Still another object of the present invention is to provide a novel method for preparing the acid carboxymethylcellulose product.

A further object is to provide novel compositions comprising the acid carboxymethylcellulose product and a method for preparing them.

Other objects, including the provision of a novel compressed composition in tablet form comprising the acid carboxymethylcellulose as a disintegrating agent, will become apparent from a consideration of the following specification and claims.

It has been discovered, and it is upon this that the invention is based, that a colloidal dispersion of acid carboxymethylcellulose, such as discussed above, can be sprayed as a mist into a hot stream of gas whereby the water associated with the mist droplets is separated from the acid carboxymethylcellulose providing solid acid carboxymethylcellulose in very finely-divided, relatively uniformly-sized, particle form, to provide a product which possesses unusual, valuable properties not shared by other solid forms of acid carboxymethylcellulose heretofore known.

The product is white and resembles, in appearance and texture, cornstarch. Its particle size is extremely small as well as relatively uniform, and, when viewed under a compound microscope, the product's particle size is in the range of 0.5 to 20 microns. The material is readily dispersible in water to provide milky, cloudy suspensions. The material is not absorbable by mucous membrane, or digestible. The acid carboxymethylcellulose of the present invention has high buffering capacity and high acid reserve.

As stated, the material treated in accordance with the present invention is an aqueous dispersion of acid carboxymethylcellulose. Such a dispersion will normally be prepared from an aqueous solution of a water-soluble salt of carboxymethylcellulose, for instance the alkali salts, such as the alkali metal salts, including ammonium salts, alkaline earth metal salts, and the like. Since the most common salt of carboxymethylcellulose is the sodium salt, this salt will be most usually employed. The treatment of such a salt solution will involve replacement of salt cation, e. g., the sodium ions in the foregoing structural formula, with hydrogen ions. The preferred method of doing this comprises treating the aqueous solution of the salt of carboxymethylcellulose with an acid-activated, cation exchange resin. The acid-activated cation exchange resins which may be employed generally comprise a water-insoluble synthetic resin containing strong acid groups, such as sulfonic acid residues, so that it will contain hydrogen ions available for exchange. For preparing the aqueous dispersion of acid carboxymethylcellulose treated in accordance with the present invention, a strong exchanger comprising a high molecular weight polymer containing sulfonic acid residues as a portion of the polymer are preferred. The salt solution subjected to ion exchange will generally have a concentration of carboxymethylcellulose salt between about .5 and about 3%, preferably in the neighborhood of about 1–2%. The exact procedure for producing the dispersions of acid carboxymethylcellulose is not material from the standpoint of the broader aspects of the present invention, so long as a stable colloidal dispersion of the acid carboxymethylcellulose is obtained; and as stated above, the use of ion exchange is preferred inasmuch as it provides a stable, relatively pure dispersion of the acid carboxymethylcellulose in a single operation.

Since each anhydroglucose unit in a cellulose molecule contains three reactive hydroxyl groups which can be converted to carboxymethyl groups, theoretically complete reaction would mean the introduction of three carboxymethyl groups per anhydroglucose unit. Such a completely reacted product would have a "degree of substitution" of 3; and the carboxymethylcellulose salt converted to acid form and the resulting acid itself may have a degree of substitution at or near this figure. However, the optimum combination of physical properties for sodium carboxymethylcellulose is actually achieved with a degree of substitution of from 0.3 to about 1.2, the commercial forms of sodium carboxymethylcellulose generally having a degree of substitution of about .7–.8. Hence, the carboxymethylcellulose salt employed in preparing the acid dispersion and the resulting acid itself, will often have a degree of substitution within these ranges.

In the conversion of the carboxymethylcellulose salt solution to the dispersion of acid carboxymethylcellulose treated in accordance with the present invention, it is not necessary that all of the salt groups in the former be converted to free acid carboxy groups. Products having valuable, novel properties may be provided from acid carboxymethylcellulose in which as low as about 40% of the salt groups have been converted to free acid carboxy groups. For example, products prepared from sodium carboxymethylcellulose having a degree of substitution of about 0.7–0.8 and wherein about 40–60% of the sodium has been replaced by hydrogen, will have, when suspended in water, a pH in the neighborhood of 3.5–5.5. Such products will, therefore, be of especial utility in applications to the skin and mucous membrane for treatments discussed more in detail hereinafter. On the other hand, where higher water-insolubility is desired, the salt groups may be at least substantially completely converted to free acid carboxy groups; that is to say, at least 80–90%, and up to 100%, of the salt groups, may be converted to free acid carboxy groups.

In accordance with the process of the present invention, the aqueous dispersion of acid carboxymethylcellulose is dispersed as a mist into a stream of hot gas, as by injecting the aqueous mixture into the hot gas stream through an atomizing nozzle adapted to disrupt the aqueous dispersion into fine droplets comparable in size to that of the water droplets in fog. The gaseous medium normally employed is air, although other gases, such as carbon dioxide, nitrogen, mixtures thereof, and the like, may be used.

The temperature of the hot gas into which the aqueous dispersion is sprayed will depend upon many factors including the relative proportion of aqueous dispersion to gas, the heat capacity of the gas, the temperature of the aqueous dispersion, and the like, so long as it is sufficiently high to cause substantially complete vaporization of the water associated with the droplets. In most cases, the temperature of the gas into which the aqueous dispersion is sprayed will be at least about 150° C. Since much of the heat in the gas is quickly expended in heating the aqueous dispersion, converting the water therein to steam and heating the resulting steam, the temperature of the gas may go well above this without danger of destroying the acid carboxymethylcellulose product and may go up to about 325° C., or even higher. A preferable temperature for the gas into which the dispersion is atomized is between about 190 and 270° C.

Upon being dispersed into the stream of hot gas, the water associated with the dispersed droplets vaporizes leaving behind very small particles of acid carboxymethylcellulose. These particles are then separated from the gas stream and collected, as in a cyclone collector, or the like.

Macroscopic examination of the resulting powder shows that it is similar to cornstarch in general appearance and texture. Microscopic examination of the particles, however, shows that they are different in form from cornstarch, and exist as tiny, generally rounded bodies, hollow as well as solid, and fragments thereof. The particle size of the powder is very small and is relatively uniform. When viewed under a compound microscope, the particle sizes fall within the range of 0.5 to 20 microns. The surface average particle size lies between about 0.1 and about 5 microns. The powdered product is readily dispersible in water yielding cloudy or milky suspensions which do not settle out rapidly.

Depending upon the degree of substitution of the initial carboxymethylcellulose salt and the degree of conversion of the salt to free acid the exact nature of the product, insofar as acidity is concerned, will vary somewhat. For example, when the product is prepared by completely converting to the acid form a carboxymethylcellulose salt having a degree of substitution of 3, the acid equivalent weight will be about 73. On the other hand, where the degree of substitution of the salt is about 0.3 and only about 40% of the salt groups are converted to free acid carboxy groups, the acid equivalent weight of the resulting acid carboxymethylcellulose may be as high as about 2500. With substantially completely converted acid carboxymethylcellulose having a degree of substitution between about 0.3 and about 1.2, the product will have an acid equivalent weight of between about 750 and about 180. The pH of aqueous suspensions formed from the present product will range between about 2 and about 5. On addition of alkali to an aqueous suspension of the product, a potentiometric titration curve is obtained which is typical of a moderately strong monobasic acid. The product has good buffering capacity, particularly at a pH in the neighborhood of about 4, and is a cation exchanger. The product may possess a high acid reserve, depending upon degree of substitution and degree of conversion to the acid form. This property in conjunction with its high buffering capacity, its relative insolubility and its inability to be absorbed, makes it ideally suited for providing or restoring to localized areas of the human body acid pH conditions conducive to overcoming infections caused by bacteria and other microorganisms. Studies have shown that considerable inhibition of *M. pyogenes* var. *aureus*, *E. coli*, and *S. faecalis* occurs in aqueous suspensions containing the acid carboxymethylcellulose of the present invention, and the degree of inhibition is related to the pH of the medium. In addition to these properties, the acid carboxymethylcellulose of the present invention is non-irritating and non-toxic. It is therefore amenable to use alone or with other pharmaceutical agents in ointments, suppositories, tablets, creams, and the like.

Because of the foregoing properties, the acid carboxymethylcellulose of the present invention is also effective in inhibiting the oxygen uptake of spermatazoa which appears to be a pH effect. Hence, the product of the present invention is also suitable for use in spermatocidal formulations.

One of the principal uses for the powdered acid carboxymethylcellulose product of the present invention is as a tablet disintegrating agent. It has been found that when the powdered material is incorporated with a medicament and any other materials, e. g., extender, lubricant and binder, to be incorporated in a tablet, and the mixture compressed into a tablet, the tablet will disintegrate in water much more rapidly than similar tablets without the acid carboxymethylcellulose. This disintegrating power is due to swelling of the acid carboxymethylcellulose powder upon hydration in the presence of water. One of the conventional tablet disintegrating agents heretofore known is starch. It has been found that in many cases the powdered acid carboxymethylcellulose of the present invention imparts disintegrating times equal to or faster than does a similar weight of starch. More important than this, however, is that it may be prepared into a granulation with the other medicament or medicaments using aqueous liquids without its losing its disintegrating power, since simple drying of the granulations before compression into tablets returns the acid carboxymethylcellulose powder to its original potentially swellable form; whereas the starch disintegrating agent must be added to the tablet mix, comprising the granulated medicament, as a dry powder, necessitating an additional weighing and mixing step. Otherwise, preliminary contact with water during the granulation procedure would prematurely remove from the starch some or all of its disintegrating properties, and these would not be regained during simple drying of the granulation.

In using the powdered acid carboxymethylcellulose of the present invention as a tablet disintegrating agent, the powdered acid carboxymethylcellulose is incorporated in any desired manner with the other materials going to make up the tablet. The powdered acid carboxymethylcellulose may be merely mixed physically with the other medicaments, the other medicaments being in desired granulation form for tableting, or the powdered acid carboxymethylcellulose may be made up into granulations with the other medicament or medicaments. In any event, the tablet mix comprising the powdered acid carboxymethylcellulose and medicament, and extended, lubricant and/or binder, is compressed into tablet form following techniques known in conventional pharmaceutical practice.

As indicated previously, the preferred procedure involves the preparation of granulations comprising the powdered acid carboxymethylcellulose as well as the other medicament or medicaments sought to be made up into tablet form. In preparing a granulation comprising the powdered acid carboxymethylcellulose, conventional granulation technique may be employed. Generally, the powdered acid carboxymethylcellulose is mixed with the medicament or medicaments to be tableted, along with a suitable binding agent, such as a starch paste, solution of gelatin, solution of a gum, e. g. tragacanth, acacia, and the like. The cohesive mixture is then forced through small openings such as in a sieve or screen to provide granules of predetermined size. The resulting moist granules are then dried. Generally the resulting dried granules are further reduced in size as by forcing them through a finer sieve or screen. The resulting granulation is then, by itself or in admixture with other materials to be compressed into tablet form, pressed under high pressure, usually at least about 1000 lb. per tablet, into the desired tablet form.

The proportion of powdered acid carboxymethylcellulose in the tablet and tablet mix may range widely, since, in addition to its tablet-disintegrating properties, the powdered acid carboxymethylcellulose may also be employed for its other pharmaceutical properties as well as an extending agent. Generally, in order to impart significant disintegrating properties, the amount of powdered acid carboxymethylcellulose in the tablet mix will be at least about .5%, by weight, based upon the weight of the tablet mix. The amount employed may be any amount above this and may range as high as about 30%, by weight, or even higher, of the tablet mix.

The preparation of the novel powdered acid carboxymethylcellulose product of the present invention as well as the preparation of the novel compressed compositions, such as tablets, comprising the novel powdered acid carboxymethylcellulose will be more readily understood from a consideration of the following specific examples which are given for the purpose of illustration only and are not intended to limit the scope of the invention in any way.

EXAMPLE I

A 2% solution of sodium carboxymethylcellulose having a degree of substitution of about 0.7 (Hercules CMC-70) is passed through columns of a sulfonic acid type cation exchange resin (Amberlite IR-120 of Rohm & Haas Co.) to convert substantially the sodium salt form into free acid.

The resulting dispersion of acid carboxymethylcellulose is then atomized and injected as a mist into a chamber through which a stream of air at about 230° C. is being passed. The resulting solid powdered product is collected in a cyclone separator. The white powder is very similar in macroscopic appearance and texture to cornstarch, its average ash content is 0.78% and its average acid equivalent weight is 287. The product is readily dispersible in water forming cloudy, rapidly hydrated dispersions. A 0.5% dispersion in water shows a pH of about 2.3.

EXAMPLE II

Granulations for the preparation of sulfathiazole tablets are prepared by mixing powdered acid carboxymethylcellulose prepared in accordance with Example I (in amounts set forth in the following table) with sulfathiazole powder, and adding 10% starch paste and additional water as set forth in the following table. The resulting moist mixtures are then pushed through a #10 mesh stainless steel wire sieve, and the resulting granules are dried at 45° C. for 2 hours. The dried granules are then pushed through a #20 mesh sieve, and those retained on a #60 mesh sieve are used to make test tablets. Various granulations are prepared in which the proportion of materials vary in accordance with the following table:

Table I

| Granulation | A | B | C | D | E | F |
|---|---|---|---|---|---|---|
| Percent Acid Carboxymethylcellulose Powder in Granulation | 1 | 2 | 4 | 8 | 15 | 30 |
| Acid Carboxymethylcellulose, grams | 1 | 2 | 4 | 8 | 15 | 30 |
| Sulfathiazole, grams | 96 | 95.1 | 93.1 | 89.2 | 82.4 | 67.9 |
| 10 Percent Starch Paste, grams | 30 | 29 | 29 | 28 | 26 | 21 |
| Additional Water, cc | 14 | 14 | 23 | 27 | 36 | 60 |

Twelve portions of 0.33 gram each are weighed from each granulation and compressed into tablets, using each of ten compressional forces, one by one, using a ⅜ inch punch and die set and a mechanical lever machine. The ten compressional forces used are: 500, 1,000, 1,500, 2,000, 2,500, 3,000, 4,000, 5,000, 6,500, and 8,000 lb. per tablet. When the tablets are two days old disintegrating determinations are made.

The procedure used for determining the disintegration times of the tablets is essentially that of U. S. P. XIV. Disintegration times are recorded in seconds as follows:

Table II

| Compressional Force (lb. per tablet) | Disintegration time in seconds for tablets prepared from granulation— | | | | | |
|---|---|---|---|---|---|---|
| | A | B | C | D | E | F |
| 500 | 96 | 52 | 48 | 36 | 31 | 12 |
| 1,000 | 463 | 111 | 69 | 42 | 34 | 15 |
| 1,500 | 712 | 162 | 72 | 41 | 35 | 15 |
| 2,000 | 1,020 | 358 | 138 | 42 | 47 | 17 |
| 2,500 | 1,192 | 461 | 155 | 55 | 45 | 20 |
| 3,000 | 1,586 | 365 | 119 | 44 | 49 | 23 |
| 4,000 | 2,151 | 650 | 195 | 62 | 83 | 28 |
| 5,000 | 5,660 | 449 | 95 | 81 | 79 | 31 |
| 6,500 | 2,100 | 422 | 80 | 81 | 88 | 32 |
| 8,000 | 14,000 | 244 | 81 | 84 | 98 | 34 |

Considerable modification is possible in the exact nature of the dispersion treated in accordance with the present invention and in the resulting product, as well as in the exact techniques employed in carrying out the present invention and in preparing compressed tablets and

We claim:

1. The method of preparing a solid, acid carboxymethylcellulose product in finely-divided, relatively uniform particle size form which comprises replacing at least about 80% of the alkali cations of an aqueous solution of an alkali salt of carboxymethylcellulose having a degree of substitution of at least about 0.3 with hydrogen ions to provide an aqueous dispersion of an acid carboxymethylcellulose, atomizing said aqueous dispersion as a mist into a hot gas stream having a temperature of at least 150° C., whereby the water associated with the mist droplets is vaporized, and separating the resulting solid, finely-divided acid carboxymethylcellulose having a particle size within the range between about 0.5 to about 20 microns from the gas.

2. The method of claim 1 wherein said alkali salt is sodium carboxymethylcellulose, and wherein said replacement is conducted by treating said aqueous solution of sodium carboxymethylcellulose with an acid cation exchange resin.

3. The method of preparing a solid, acid carboxymethylcellulose product in finely-divided, relatively uniform particle size form which comprises atomizing an aqueous dispersion of acid carboxymethylcellulose, having a degree of substitution above about 0.3 and at least 80% of carboxy groups as free acid carboxy groups, as a mist into gaseous medium having a temperature of at least about 150° C., whereby the water in the mist droplets is vaporized, and separating the resulting solid, finely-divided acid carboxymethylcellulose having a particle size within the range between about 0.5 to about 20 microns from said gaseous medium.

4. The method of claim 3 wherein the concentration of acid carboxymethylcellulose in said aqueous dispersion thereof is between about 0.5 and about 3%, by weight.

References Cited in the file of this patent

UNITED STATES PATENTS

| | | |
|---|---|---|
| 1,826,701 | Ames et al. | Oct. 13, 1931 |
| 1,900,517 | Pasternack et al. | Mar. 7, 1933 |
| 2,249,673 | Spurlin | July 15, 1941 |
| 2,317,479 | Peebles et al. | Apr. 27, 1943 |
| 2,356,896 | Smith | Aug. 29, 1944 |
| 2,460,546 | Stephanoff | Feb. 1, 1949 |
| 2,477,080 | Necheles et al. | July 26, 1949 |
| 2,484,637 | Mattocks et al. | Oct. 11, 1949 |
| 2,510,355 | Waldeck | June 6, 1950 |
| 2,617,800 | Bergman | Nov. 11, 1952 |
| 2,639,239 | Elliott | May 19, 1953 |
| 2,665,236 | Diamond | Jan. 5, 1954 |
| 2,667,482 | Rigby | Jan. 26, 1954 |
| 2,687,411 | Higgins | Aug. 24, 1954 |
| 2,693,437 | Spradling | Nov. 2, 1954 |
| 2,711,407 | Bauling et al. | June 21, 1955 |

FOREIGN PATENTS

| | | |
|---|---|---|
| 715,218 | Germany | Dec. 16, 1941 |

OTHER REFERENCES

Riegelman et al.: Jour. Am. Pharm. Assoc. (Sci. Ed.), 39 (1950), pp. 444–450.